United States Patent
Hoover et al.

(10) Patent No.: US 10,391,712 B2
(45) Date of Patent: Aug. 27, 2019

(54) SYSTEM AND METHOD FOR AUTOMATED CLEANING OF PARTS PRODUCED BY A THREE-DIMENSIONAL OBJECT PRINTER

(71) Applicant: Xerox Corporation, Norwalk, CT (US)

(72) Inventors: Linn C. Hoover, Webster, NY (US); Erwin Ruiz, Rochester, NY (US); Ron E. Dufort, Rochester, NY (US); Patrick J. Howe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 245 days.

(21) Appl. No.: 15/047,206

(22) Filed: Feb. 18, 2016

(65) Prior Publication Data

US 2017/0239893 A1    Aug. 24, 2017

(51) Int. Cl.

| | |
|---|---|
| *B29C 64/40* | (2017.01) |
| *B29C 64/386* | (2017.01) |
| *B29C 64/379* | (2017.01) |
| *B29C 64/393* | (2017.01) |
| *B33Y 99/00* | (2015.01) |
| *B33Y 40/00* | (2015.01) |
| *B29C 64/35* | (2017.01) |
| *B08B 3/02* | (2006.01) |
| *B08B 5/02* | (2006.01) |
| *B33Y 10/00* | (2015.01) |

(52) U.S. Cl.
CPC ............ *B29C 64/40* (2017.08); *B08B 3/024* (2013.01); *B08B 5/02* (2013.01); *B29C 64/35* (2017.08); *B29C 64/379* (2017.08); *B29C 64/386* (2017.08); *B29C 64/393* (2017.08); *B33Y 40/00* (2014.12); *B33Y 99/00* (2014.12); *B08B 2203/007* (2013.01); *B33Y 10/00* (2014.12)

(58) Field of Classification Search
CPC ....... B29C 64/35; B29C 64/357; B29C 64/00; B29C 64/10; B29C 64/171; B29C 64/188; B29C 64/386; B29C 64/393; B33Y 50/00; B33Y 50/02
USPC .................................................. 451/5; 901/10
See application file for complete search history.

(56) References Cited

U.S. PATENT DOCUMENTS

| | | | | |
|---|---|---|---|---|
| 4,541,062 A | * | 9/1985 | Kada ...................... | B23K 9/032 219/124.34 |
| 4,670,641 A | * | 6/1987 | Porsander .............. | B23K 9/287 219/124.34 |

(Continued)

*Primary Examiner* — Seyed Masoud Malekzadeh
*Assistant Examiner* — Taryn Trace Willett
(74) *Attorney, Agent, or Firm* — Maginot Moore & Beck LLP

(57) ABSTRACT

A method of operating a cleaning system removes support material from parts made by a three-dimensional printer. The method operates the cleaning system to correlate data for features on a part located within a receptacle with structural data in a file used by the three-dimensional printer to fabricate the part. The method then operates one or more actuators to locate a fluid directing nozzle pneumatically connected to a pressurized fluid source opposite areas containing support material and operates the pressurized fluid source to enable pressurized fluid to be directed by the fluid directing nozzle at the support material. The method includes generating image data of the cleaned areas with an image sensor so the removal of the support material can be confirmed, and if an area is not sufficiently cleaned, the cleaning operation can be repeated.

8 Claims, 4 Drawing Sheets

(56) References Cited

U.S. PATENT DOCUMENTS

| | | | |
|---|---|---|---|
| 4,807,152 A * | 2/1989 | Lane | G01B 7/008 |
| | | | 318/578 |
| 5,427,128 A | 6/1995 | Minkin | |
| 5,524,653 A | 6/1996 | Minkin et al. | |
| 5,709,587 A * | 1/1998 | Shaffer | B24B 1/00 |
| | | | 451/38 |
| 5,759,086 A * | 6/1998 | Klingel | B24C 1/045 |
| | | | 451/102 |
| 5,782,252 A | 7/1998 | Lewis et al. | |
| 6,887,125 B2 * | 5/2005 | Kurogouchi | B24C 1/08 |
| | | | 451/38 |
| 8,758,088 B2 * | 6/2014 | Duescher | B24B 37/107 |
| | | | 451/11 |
| 8,822,875 B2 * | 9/2014 | Webster | A61B 18/20 |
| | | | 219/121.11 |
| 8,926,399 B2 * | 1/2015 | Asai | B24C 1/00 |
| | | | 451/102 |
| 9,457,428 B2 * | 10/2016 | Webster | A61B 18/20 |
| 9,561,578 B2 * | 2/2017 | Geyer | B24C 1/10 |
| 2002/0086247 A1 * | 7/2002 | Coe | B33Y 50/02 |
| | | | 430/328 |
| 2004/0148048 A1 * | 7/2004 | Farnworth | B33Y 50/02 |
| | | | 700/119 |
| 2006/0048364 A1 * | 3/2006 | Zhang | B23Q 17/0966 |
| | | | 29/407.08 |
| 2010/0170540 A1 * | 7/2010 | Kritchman | B08B 3/006 |
| | | | 134/34 |
| 2013/0265365 A1 | 10/2013 | Moscato et al. | |
| 2014/0257549 A1 * | 9/2014 | Swartz | B29C 67/0088 |
| | | | 700/119 |
| 2015/0352716 A1 * | 12/2015 | Sonehara | B25J 9/1633 |
| | | | 700/261 |
| 2016/0031156 A1 * | 2/2016 | Harkness | B29C 67/0059 |
| | | | 264/427 |
| 2016/0039091 A1 * | 2/2016 | Bruemmer | G06K 9/00791 |
| | | | 700/258 |
| 2017/0120337 A1 * | 5/2017 | Kanko | B22F 3/1055 |

\* cited by examiner

SYSTEM AND METHOD FOR AUTOMATED CLEANING OF PARTS PRODUCED BY A THREE-DIMENSIONAL OBJECT PRINTER

TECHNICAL FIELD

The device and method disclosed in this document relates to three-dimensional object printers and, more particularly, to the cleaning of the objects produced by these printers.

BACKGROUND

Digital three-dimensional object manufacturing, also known as digital additive manufacturing, is a process of making a three-dimensional solid object of virtually any shape from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

Additive manufacturing of three-dimensional parts typically includes the ejecting of at least two types of materials. One material is typically called build material, which is the material used to form the structures of the part. The other material is typically called support material since it is used to provide support for the extremely thin layers (16-30 μm) of build material until the part is completed and fully cured. Both support and build materials can be ejected simultaneously or sequentially in each layer forming the part during the manufacturing process. The support material is removed from the part once the part is complete. Previously known removal processes are based on the support material properties. For example, a phase change support material can be removed by placing the part in an oven or heated liquid bath where the temperature of the air or fluid is above the melting temperature of the support material to enable the support material to melt and flow away from the part. A soluble support material can be dissolved in a chemical bath or removed with a directed flow of pressurized fluid.

Manually cleaning the part with pressurized fluid can be done with the system 100 shown in FIG. 4. That system includes a tank 104 having a hinged lid 108 and gloved portals 112. The tank 104 is pneumatically connected to a pressurized source of fluid 116 that terminates in a handheld wand or nozzle inside the tank. The operator places the object or objects into the tank 104, closes the lid 108, places his or her hands into the gloves of portals 112 and grips the part and the wand. The wand is usually provided with a trigger that manipulates a valve to enable the pressurized fluid to be selectively directed towards the part held by the operator. Once the operator determines the support material has been removed from the part, the operator's hands are removed from the portals, the lid is opened, and the part removed for a closer inspection. If support material remains, the part or parts are returned to the tank for additional cleaning. If the support material has been sufficiently removed, the part is returned to processing for packaging or quality inspection.

This system and its method of operation requires multiple cycles because the operator's vision of the part in the tank 104 is obstructed by the fluid spray. This vision obstruction makes the directing of the fluid stream into the numerous nooks and crannies of the part difficult. Thus, the operator may need to remove the part from the washer, visually inspect the part for support material, and return the part to the tank for additional cleaning several times before the cleaning of the part is complete. A cleaning system for parts produced by a three-dimensional object system that is able to clean the parts more thoroughly in a single session would be beneficial.

SUMMARY

A method of cleaning parts produced by a three-dimensional object printer automates the cleaning process and enables more thorough removal of the support material. The method includes correlating with a controller data corresponding to a part within a receptacle with structural data for the part that was used by the three-dimensional object printer to make the part, directing with the controller fluid from a fluid directing nozzle towards an area of the part in which support material is located, the directing being made with reference to structural data for the part after the structural data has been correlated to the data corresponding to the part within the receptacle, and continuing with the controller to direct fluid from the fluid directing nozzle to remove support material from other areas of the part, the directing of the fluid being made with reference to the structural data for the part.

A system for cleaning parts produced by a three-dimensional object printer automates the cleaning process and enables more thorough removal of the support material. The system includes a receptacle having a device for securing a part within the receptacle, a fluid directing nozzle pneumatically connected to a pressurized source of fluid, a plurality of actuators, which are operatively connected to the device securing the part and the fluid directing nozzle, and a controller operatively connected to the plurality of actuators and the pressurized source of fluid. The controller is configured to correlate data of features on the part secured within the receptacle with structural data for the part that was used by the three-dimensional object printer to make the part, to operate the actuators in the plurality of actuators to move the fluid directing nozzle, the device securing the part, or both to position the fluid directing nozzle towards an area of the part in which support material is located with reference to structural data for the part after the structural data has been correlated to the data for features on the part within the receptacle, to operate the source of pressurized fluid to direct pressurized fluid through the fluid directing nozzle at the support material on the part, and continuing to operate the actuators to position the fluid directing nozzle opposite other areas of the part with reference to the structural data for the part and to operate the source of pressurized fluid to remove support material from the other areas of the part.

BRIEF DESCRIPTION OF THE DRAWINGS

The foregoing aspects and other features of the method and device are explained in the following description, taken in connection with the accompanying drawings.

DETAILED DESCRIPTION

Figure 1:
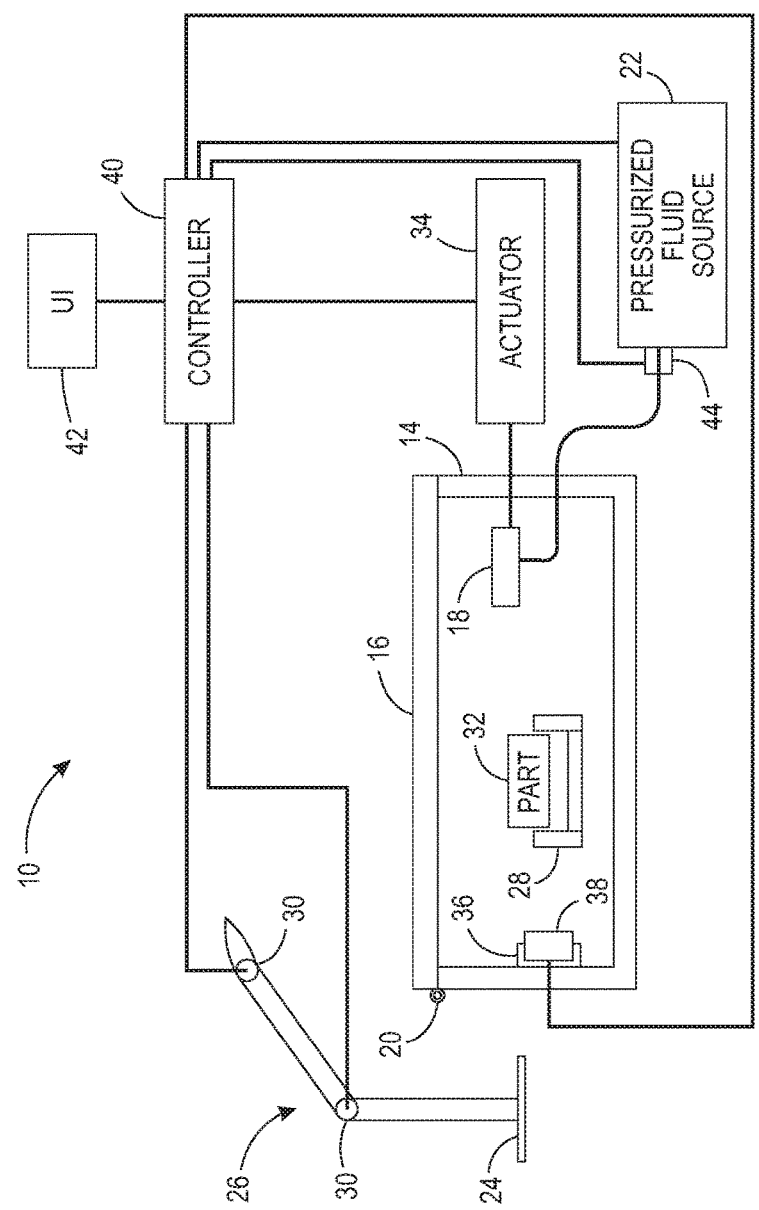
FIG. 1 shows a system for automated cleaning of parts produced by a three-dimensional object printer.

For a general understanding of the environment for the method and cleaning system disclosed herein as well as the details for the method and cleaning system, reference is made to the drawings. In the drawings, like reference numerals designate like elements.

FIG. 1 depicts a system for automated cleaning of parts produced by a three-dimensional object printer. The system 10 includes a receptacle 14 (shown in a cross-sectional view in the figure), a fluid directing nozzle 18 that is pneumatically connected to a pressurized source of fluid 22. Receptacle 14 includes a lid 16 that is connected to the receptacle by a hinge 20. As explained below, the system can include an articulated arm 26 having sensors 30 at each joint of the arm is positioned proximate the receptacle to enable the end of the arm to be manipulated within the interior volume of the receptacle when lid 16 is open. The sensors 30 are configured to generate positional data for three orthogonal axis positioned at a reference datum 24 associated with the articulated arm. While reference datum 24 is shown at the base of the articulated arm 26, the reference datum can be located at other positions on the arm. A clamp 28, or other securing device, is positioned within the receptacle to secure a part 32 within the receptacle as it is subjected to a stream of pressurized fluid emitted by the fluid directed nozzle 18. Fluid directing nozzle 18 is operatively connected to one or more actuators 34 to enable the nozzle 18 to move three dimensionally within the volume of the receptacle 14. Also within receptacle 14 is an optical sensor 38 that can be mounted within or on a rail 36 and operatively connected to one of actuators 34 to enable the optical sensor 38 to move within the receptacle and generate digital image data of the part 32. Additionally or alternatively, the clamp 28 can be mounted on a rail or other support system and operatively connected to one of the actuators 34 to enable the part to be manipulated in its orientation or moved within the volume of receptacle 14.

A controller 40 is operatively connected to one of the actuators 34, the sensors 30 of the articulated arm 26, the optical sensor 38, and the pressurized source of fluid 22. In one embodiment, the controller 40 is operatively connected to a valve 44 positioned within the conduit connecting the pressurized source of fluid 22 to the fluid directing nozzle 18. By operating the valve 44, the pressurized fluid from the source 22 is selectively emitted from the fluid directed nozzle 18. The controller 40 is further configured to operate an actuator 34 to move the fluid directed nozzle 18 to various positions within the volume of the receptacle 14. The controller 40 can include or be operatively connected to a memory in which structural data that was used by a three-dimensional object printer to produce the part are stored. The controller 40 is configured with programmed instructions and electronic components to use the positional data received from the sensors 30 of the articulated arm 26 to identify the position of the end of the articulated arm 26 within the volume of the receptacle 14. An operator places the end of the articulated arm 26 at a particular location on the part and uses a user interface 42 to identify the position on the part 32 to the controller 40. After receiving the positional data for at least three positions on the part, the controller 40 can correlate these positions with the corresponding structural data stored in the memory 48. Thereafter, the controller 40 can identify positions that contain support material on the part 32 in the clamp 28 within the volume of the receptacle. Alternatively or additionally, the controller 40 can receive digital data generated by the optical sensor 38 and compare the digital data to the structural data used to produce the part to determine the orientation of the part 32 and the areas of the part that correspond to build material and to support material. The optical sensor 38 can be a digital camera or three-dimensional scanner. As used in this document, "correlation of part positions with structural data" means data identifying particular features on the part are compared with the structural data used to produce the part to determine the orientation and position of the part within the receptacle 14. The controller 40 can then operate one or more actuators 34 to move the fluid directing nozzle or the part or both to position the nozzle opposite each one of the areas containing support material and then operate the pressurized source of fluid 22 to direct a stream of pressurized fluid at the support material in each of these areas. The pressurized fluid removes the support material through mechanical interaction of the fluid and the support material. In some embodiments, the pressurized fluid is heated so the support material softens or melts in response to contact with the heated fluid to facilitate removal of the support material. Additionally or alternatively, in some embodiments, the pressurized fluid may be a solvent or other chemical capable of interacting with the support material chemically to remove the support material from the part more quickly.

Figure 2:
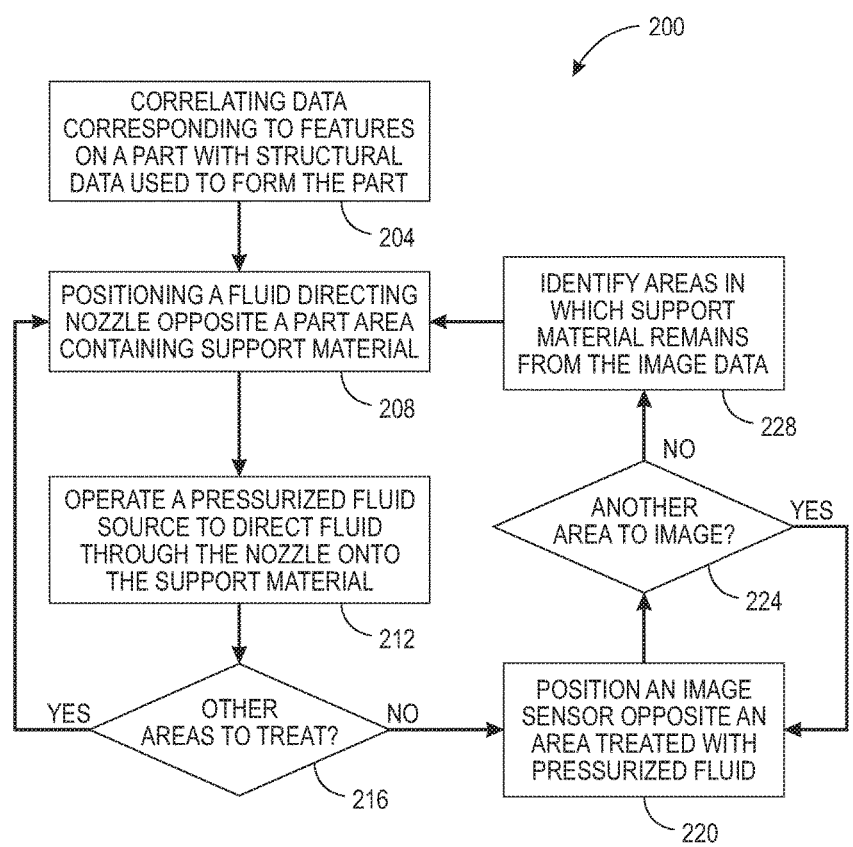
FIG. 2 shows a method of operating the system of FIG. 1 to clean parts produced by a three-dimensional object printer.

A method 200 for operating the system 10 is shown in FIG. 2. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 40 noted above can be such a controller or processor. Alternatively, the controller can be implemented with more than one processor and associated circuitry and components, each of which is configured to form one or more tasks or functions described herein.

When the method 200 is performed, it begins by correlating data corresponding to features on a part within the receptacle 14 with structural data for features on the part that was used by the three-dimensional object printer to make the part (block 204). As noted previously, this correlation can be performed by identifying at least three positions on the part within the receptacle with reference to the positional data generated by the sensors of the articulated arm and then correlating the at least three identified positions with the structural data for the part. Alternatively, the controller can correlate a digital image data of the part 32 in clamp 28 generated by the optical sensor 38 with the structural data used to form the part. The process proceeds by positioning a fluid directing nozzle 18 towards an area of the part where the structural data indicates support material is located (block 208). That is, the correlation of the structural data with the part in the receptacle enables the controller to move the fluid directing nozzle within the volume of the receptacle to positions opposite areas containing support material. Once positioned opposite an area in which support material is located, a source of pressurized fluid operatively connected to the fluid directing nozzle is operated to direct pressurized fluid onto the support material at the area of the part in which the support material is located (block 212). The amount of time that the controller 40 operates the source 22 to direct fluid towards a specific area of the part corresponds to the amount of support material indicated by the structural data used to build the part 32. The pressurized fluid source 22 can be operated by selectively opening and closing a valve 44 to enable pressurized fluid to be emitted from the nozzle 18. Additionally, the fluid source 22 can be configured to generate a pulsating stream of fluid to enhance the mechanical action of the fluid stream against the support material. The process continues by referencing the structural data to identify other areas for support material removal (block 216) and then continuing to position the fluid directing nozzle at those areas and operating the source of pressurized fluid to remove support material from the other areas of the part (blocks 208 and 212). Once all of the areas having support material are treated with the pressurized fluid from the pressurized fluid source, a verification process is performed.

The verification process is performed in the process 200 by positioning the optical sensor 38 opposite an area where the nozzle 18 was positioned during the support material removal process (block 220). After each area is imaged (block 224), these image data are used by the controller 40 to identify areas of the part in which support material remains (block 228). Once all of the areas have been identified (block 228), the controller 40 correlates a new cleaning cycle in which the nozzle 18 is positioned opposite the areas in which support material remains (block 208) and the pressurized fluid source is operated (block 212) to apply additional pressurized fluid to the remaining support material in the area. This additional support material treatment continues until all of the areas in which support material remained have been treated (block 216). The verification process is then repeated (blocks 220 to 228) to identify whether any of the areas continue to require additional pressurized fluid treatment. If they do, the support material removal process is repeated (blocks 208 to 216) and the verification process is repeated (block 220 to 228) until all of the areas of the part containing support material are relatively empty of the support material.

Figure 3:
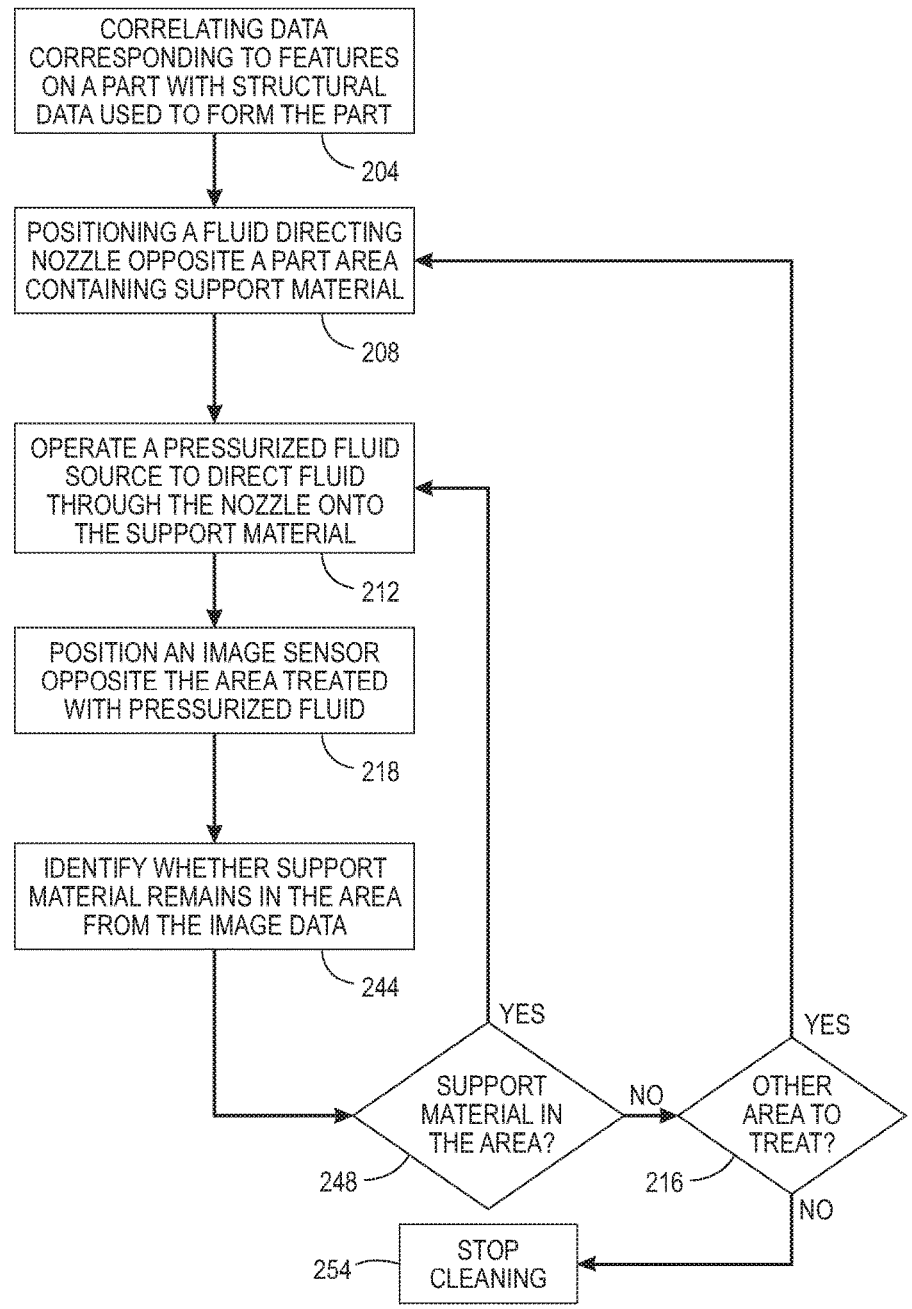
FIG. 3 shows an alternative method of operating the system of FIG. 1 to clean parts produced by a three-dimensional object printer.
Figure 4:
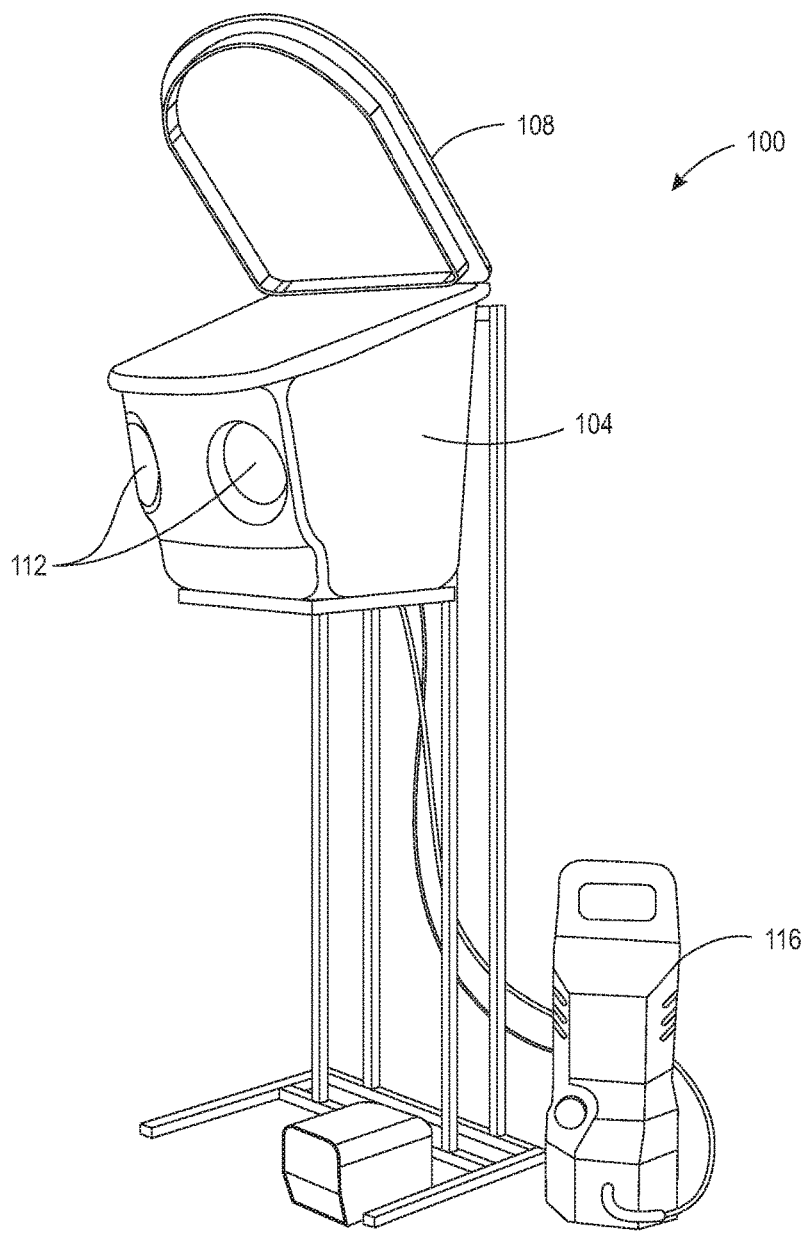
FIG. 4 shows a prior art system for manually cleaning parts produced by a three-dimensional object printer.

In an alternative process shown in FIG. 3, the verification process is integrated with the support removal process. As shown in the figure, once the pressurized fluid is applied to an area (block 212), the optical sensor 38 is positioned opposite the treated area and the sensor generates digital image data of the treated area (block 218). This image data is used to identify whether support material remains (block 244), and, if it does (block 248), additional pressurized fluid is directed towards the area again (block 212). This iterative loop repeats until the support material is sufficiently removed from the area (block 244). The process then checks for additional areas to treat (block 216) and, if additional areas remain for treatment, the nozzle 18, the part 32, or both are moved to position the nozzle opposite one of those areas (block 208) and the pressurized fluid is applied to the area (block 212). The area is then imaged with the image sensor (block 218) to determine whether it requires additional treatment (block 244). Once all of the areas have been sufficiently cleaned (block 216), the process is completed and the part is removed from the receptacle (block 254).

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A system for removing support material from parts made by a three-dimensional object printer comprising:
   a receptacle having a device for securing a part within the receptacle;
   a fluid directing nozzle pneumatically connected to a pressurized source of fluid;
   a plurality of actuators, which are operatively connected to the device securing the part and the fluid directing nozzle;
   an articulated arm mounted at one end to a base and having at least two arm segments and a sensor at each joint connecting the at least two arm segments, the sensors being configured to generate positional data for three orthogonal axis with respect to a reference datum associated with the articulated arm, the positional data corresponding to a single position at an end of the arm segment in the at least two arm segments that is most distal from the base of the articulated arm; and
   a controller operatively connected to the plurality of actuators, the sensors at each joint of the articulated arm, and the pressurized source of fluid, the controller being configured to identify at least three positions on the part within the receptacle with reference to the positional data generated by the sensors at each joint of the articulated arm that correspond to at least three different locations on the part where the end of the arm segment most distal from the base has touched the part and to correlate the at least three identified positions on the part secured within the receptacle with structural data for the part that was used by the three-dimensional object printer to make the part, to operate the actuators in the plurality of actuators to move the fluid directing nozzle, the device securing the part, or both to position the fluid directing nozzle towards an area of the part in which support material is located with reference to the structural data for the part after the structural data used to make the part has been correlated to the positional data for the three identified positions on the part within the receptacle, to operate the source of pressurized fluid to direct pressurized fluid through the fluid directing nozzle at the support material on the part, and continuing to operate the actuators to position the fluid directing nozzle opposite other areas of the part with reference to the structural data used to make the part that has been correlated to the positional data for the three identified positions and to operate the source of pressurized fluid to remove support material from the other areas of the part.

2. The system of claim 1 further comprising:
   an optical sensor configured to generate digital image data; and
   the controller being operatively connected to the optical sensor and the controller being further configured to:
      correlate digital image data of the part within the receptacle generated by the optical sensor with the structural data for the part that was used by the three-dimensional object printer to make the part.

3. The system of claim 1 further comprising:
a valve operatively connected to the pressurized fluid source; and
the controller being further configured to operate the valve to enable pressurized fluid to flow through the fluid directing nozzle towards the area of the part within the receptacle at which support material is located.

4. The system of claim 3, the controller being further configured to:
operate the valve to terminate flow through the fluid directing nozzle after a predetermined time period.

5. The system of claim 2, the controller being further configured to:
identify support material remaining on the part at the area of the part opposite the fluid directing nozzle with reference to the digital image data generated by the optical sensor; and
operate the valve to enable pressurized fluid to flow through the fluid directing nozzle in response to the area opposite the fluid directing nozzle being identified as having support material remaining in the area.

6. The system of claim 1, the controller being further configured to:
operate the actuators to position the fluid directing nozzle opposite other areas of the part at which support material is located as identified by the structural data for the part in the receptacle;
operate the pressurized source of fluid to direct fluid through the flow directing nozzle towards the other areas of the part at which support material is located; and
terminate operation of the actuator to position the fluid directing nozzle opposite other areas of the part in response to each area containing support material being opposite the fluid directing nozzle and receiving pressurized fluid from the fluid directing nozzle.

7. The system of claim 1 further comprising:
an optical sensor configured to generate digital image data; and
the controller being operatively connected to the optical sensor, the controller being further configured to:
identify areas on the part that received pressurized fluid from the fluid directing nozzle in which support material remains;
operate the actuators to move the fluid directing nozzle, the device securing the part, or both to position the fluid directing nozzle opposite each identified area in which support material remains;
operate the pressurized source of fluid to enable additional pressurized fluid to flow through the fluid directing nozzle towards each identified area in which support material remains;
identify the identified areas on the part in which support material remains after receiving the additional pressurized fluid with reference to digital image data generated by the optical sensor; and
continue to operate the actuators and the pressurized source of fluid to direct additional pressurized fluid towards each area in which support material remains until the no areas are identified as having support material remaining in the area.

8. The system of claim 1 wherein the reference datum is located at the base to which the articulated arm is mounted.

* * * * *